July 9, 1929.　　　A. E. OSBORN　　　1,720,091

AUTOMATIC SLACK ADJUSTER

Filed March 26, 1925

Inventor
Alden E. Osborn

Patented July 9, 1929.

1,720,091

UNITED STATES PATENT OFFICE.

ALDEN E. OSBORN, OF NEW YORK, N. Y.

AUTOMATIC SLACK ADJUSTER.

Application filed March 26, 1925. Serial No. 18,698.

This invention relates to certain modifications and improvements in the automatically adjusting turnbuckle, Patent No. 1,477,891 of December 18, 1923, and in my automatic slack adjuster shown in my application Serial No. 657,632, filed August 14, 1923 whereby the device is particularly suited to be used in direct connection with railway car truck brake mechanism. It is shown as applied both to the usual bottom rod and to the truck brake mechanism to automatically adjust the dead lever pivot point upon the truck frame. A feature of the device is that the same spring which operates the adjuster mechanism can also serve to bring the brake levers to their normal position and release the brakes. Another feature lies in the fact that the outer barrel of the device does not turn, as is the case with that part of the mechanism illustrated in the aforementioned Patent No. 1,477,891. It should be understood that various modifications may be made in the device and that it may be applied in a great many different ways that are not shown in the accompanying drawings, without departure from the true spirit and scope of the invention as defined in the appended claims.

Figure 1:
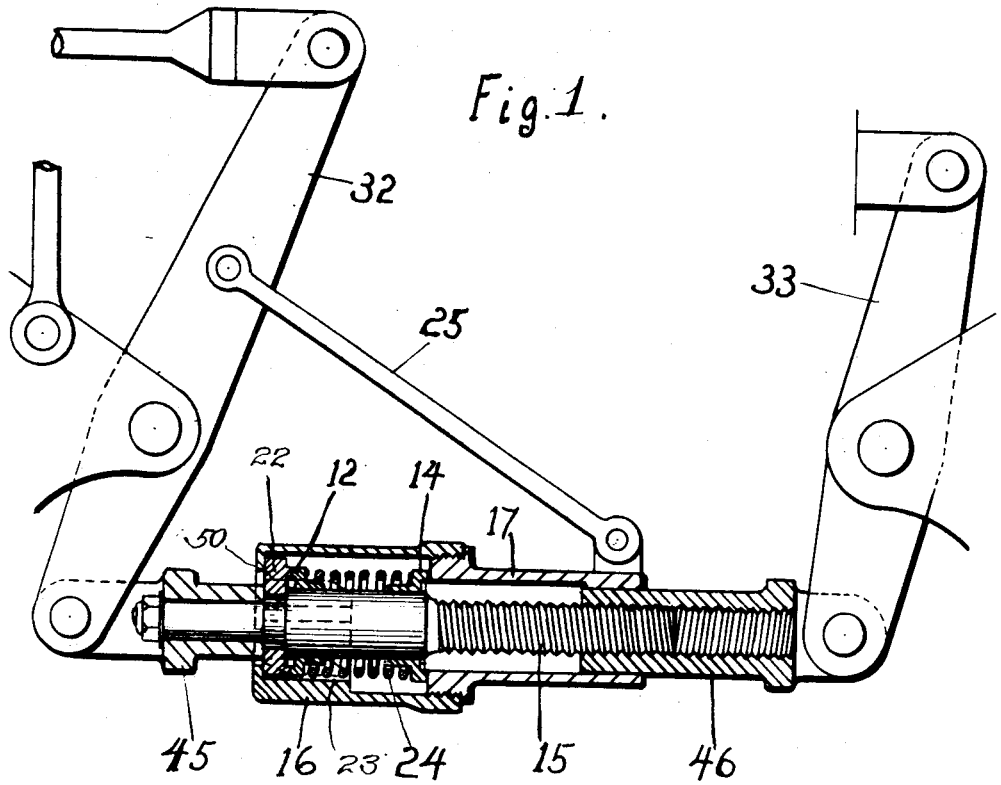
Figure 2:
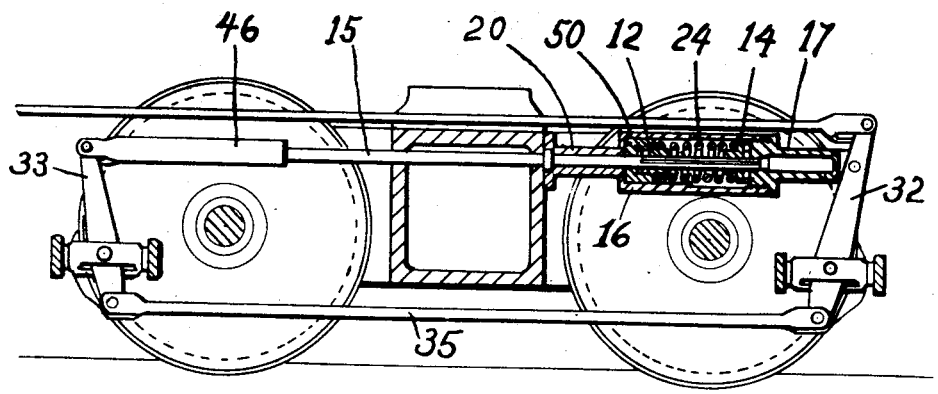

In the accompanying drawings:—
Fig. 1 represents a sectional view of my device applied to a bottom rod, and Fig. 2, represents a partial sectional view of a modified form of the adjuster shown in Fig. 1, fitted between the levers and acting to adjust the dead lever fulcrum point on the truck frame.

In Fig. 1 the lever 32 is arranged to act on the brake shoes and is pivoted on the member 45 which forms a part of the bottom rod that is connected by the adjustable member 46 to the lever 33. The rod end member 45 has a bearing in which the adjusting element or shaft 15 rotates, which shaft 15 is provided with a loose collar 50 that has on its exterior suitable keys 22 that engage keys 23 on the inside of the barrel 16. The collar 50 is provided with ratchet teeth which co-act with ratchet teeth on the ratchet disc 12 that is slidably mounted on the adjusting shaft 15, which shaft is also shown as carrying a second ratchet disc 14 which has teeth engaging teeth on the barrel cover 17, in order to show that such a second ratchet disc can be employed if it is desired to positively prevent the adjusting shaft from turning backwards. A spring 24 is mounted within the barrel 16 and is arranged, not only, to keep the ratchet in engagement and bring the adjuster parts back to the position shown, but also to act to operate the levers 32 and 33 to release the brakes and return the other brake parts to their normal position. The barrel cover 17 is connected, by means of the rod 25, to the lever 32 so that a movement of the lever 32 would cause a longitudinal motion of the barrel cover and barrel 16, with the result that the collar 50, thru the action of the spiral keys, is rotated in a reverse direction to that in which it is desired to turn the adjusting shaft 15 in order to make an adjustment. If this motion of the collar 50 is sufficient to cause a new set of ratchet teeth between it and the disc 12 to be engaged, the return of the parts to their normal position, under the action of the spring 24, would result in turning the collar 50 in the opposite direction, and, because of a new set of ratchet teeth being in engagement, rotate the adjusting shaft 15 in a direction to make the adjustment and move the adjustable member 46. The spiral keys 23 are shown by the dotted lines and are of a form having a slanting or spiral surfaces at each end, altho it is obvious a continuous spiral may be used should it be thought more desirable.

In the mechanism shown in Fig. 2 the slack adjuster is of a type suitable to be applied to the truck brake levers in such a way that the spring of the adjuster serves to disengage the brake shoes and move the other parts to their normal position, it being possible to eliminate a separate spring in the brake cylinder if it is desired. The barrel cover 17 of the slack adjuster is arranged to connect with the live lever 32 and press that lever, under the action of the spring 24, in a direction to disengage the brake shoes. The spring 24 also serves to keep the ratchet discs 12 and 14 in engagement with the cover 17 and loose collar 50. The loose collar 50 has keys on its exterior, which keys engage spiral keys on the interior of the barrel 16, the same as is the case with these parts in Fig. 1, so that, when the barrel is moved by the lever 32 being operated to engage the brakes, the collar 50 would, upon the excessive movement of the lever 32, be turned in a reverse direction and engage a new set of ratchet teeth between the collar 50 and ratchet disc 12, so that, upon the expansion of the spring 24 returning the parts to their normal position, the collar 50 would be rotated, and would carry with it the adjusting shaft 15, and, by moving the adjustable member 46, cause an adjustment of the dead lever's 33 fulcrum point. The lever 32 is connected with the lever 33 by a suitable bottom rod 35, so that both sets of brake shoes are moved in applying the brakes. The adjuster is shown as rigidly supported on the car truck frame by the member 20, but it should be understood that the method of mounting the device can be modified to meet different conditions.

Having thus described my invention I claim as new and desire to secure by Letters Patent:—

1. In an automatic slack adjuster the combination of two brake operating levers, a longitudinally slidable element connected to one of said levers, a rotatable adjusting element, an adjustable member movable by the rotation of said adjusting element and connected with the other of said levers, means whereby, when said lever connected to the longitudinally slidable element exceeds a certain pre-determined amount of travel, the excessive movement of said longitudinally slidable element rotates said adjusting element, and a spring acting to return said longitudinally slidable element and said levers to their normal position.

2. In an automatic slack adjuster the combination of two brake operating levers, a hollow longitudinally slidable element connected to one of said levers, a rotatable adjusting element, an adjustable member movable by the rotation of said adjusting element and connected to the other of said levers, means, comprising a spiral key system, whereby, when said lever connected to the longitudinally slidable element exceeds a certain pre-determined amount of travel, the excessive movement of said longitudinally slidable element rotates said adjustable element, and a spring acting to return said longitudinally slidable element and said levers to their normal position and contained within said longitudinally slidable element.

In witness whereof, I have hereunto set my hand this 25th day of March, 1925.

ALDEN E. OSBORN.